United States Patent
Hughes

[11] 3,802,775
[45] Apr. 9, 1974

[54] RAPIDLY, CONTINUOUSLY AND SYNCHRONOUSLY TUNED LASER AND LASER DETECTOR

[75] Inventor: Richard Swart Hughes, China Lake, Calif.

[73] Assignee: The United States of America as represented by the Secretary of the Navy, Washington, D.C.

[22] Filed: Sept. 5, 1972

[21] Appl. No.: 285,979

[52] U.S. Cl.................. 356/4, 356/28, 356/112, 350/163, 350/311
[51] Int. Cl.............................................. G01c 3/08
[58] Field of Search ................. 356/4, 5, 28, 112; 250/199; 350/311, 163

[56] References Cited
UNITED STATES PATENTS
3,542,472  11/1970  Vaniz.................................. 356/4
3,609,586  9/1971  Danielmeyer...................... 250/199

Primary Examiner—Maynard R. Wilbur
Assistant Examiner—S. C. Buczinski
Attorney, Agent, or Firm—R. S. Sciascia; Roy Miller

[57] ABSTRACT

A rapidly, continuously and synchronously tuned laser and laser detector incorporating a Fabry-Perot interferometer (FPI) such that one of the FPI optical reflectors is mounted on an electronically driven piezoelectric crystal and the separation of the FPI optical reflectors is varied by varying the voltage driving the crystal.

6 Claims, 1 Drawing Figure

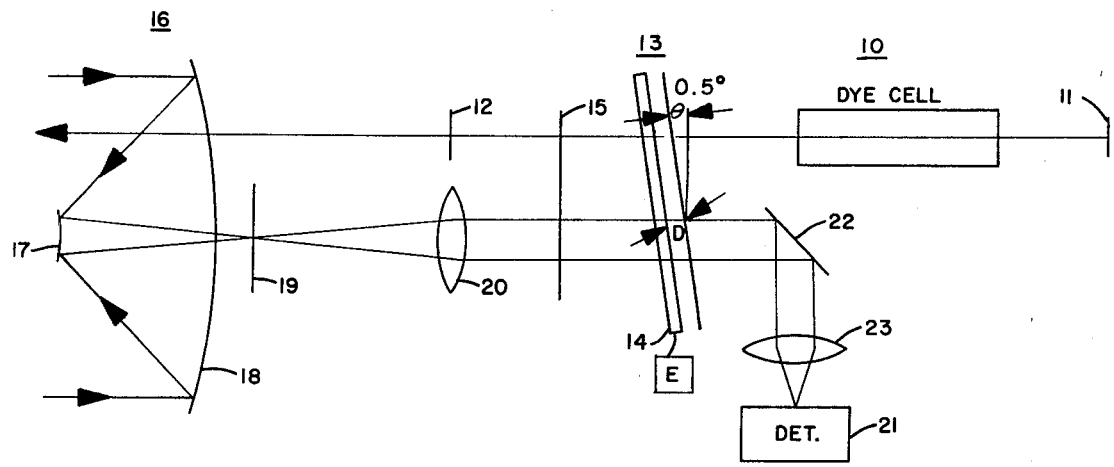

RAPIDLY, CONTINUOUSLY AND SYNCHRONOUSLY TUNED LASER AND LASER DETECTOR

CROSS-REFERENCES TO RELATED APPLICATIONS

U.S. Pat. application Ser. No. 287,113 filed Sept. 1, 1972 by Richard S. Hughes.

BACKGROUND OF THE INVENTION

Continuously tunable lasers have been developed and are presently operating. However, before a useful continuously tunable instrument or system can be made, a detector that can be synchronously tuned to the laser output wavelength must be available. Therefore, the present invention is directed to a system for continuously, rapidly and synchronously tuning a laser and laser detector.

In prior systems the system was limited to a single wavelength, e.g., a ruby laser perhaps, emitting 6,943A and a detector tuned to 6,943A. The tuning that existed in the prior systems provided for the highest possible detector signal-to-noise ratio S/N and was accomplished by placing a narrow bandpass spectral filter in front of the detector. The filter passed the laser wavelength (S) and rejected practically all other wavelengths (N). This merely increased the signal-to-noise ratio however.

SUMMARY OF THE INVENTION

The invention comprises a laser, a Fabry-Perot interferometer positioned within the laser cavity between the laser cell and the output mirror, collecting optics to collect the laser beam which is reflected from an object in space, a diaphragm which renders the collected rays parallel and a detector. The interferometer is mounted so that one of the reflective surfaces is affixed to a piezoelectric crystal which may be driven electronically to vary the spacing between the reflective surfaces of the interferometer. Thus, the output from the laser is tuned and the receiving optics is tuned synchronously therewith so that the reflected beam may be detected.

BRIEF DESCRIPTION OF THE DRAWING

The FIGURE is a line drawing of a preferred embodiment of the invention.

DESCRIPTION OF THE PREFERRED EMBODIMENT

The FIGURE is a drawing schematic representation of one embodiment of the rapidly continuously and synchronously tuned laser and laser detector. The laser 10, in the present embodiment is an organic dye laser in which the organic dye molecules may be excited by a fast rise-time flashlamp, pulsed $N_2$ gas laser or any other method which can provide the required organic dye molecule population inversion. The details of the laser and exciting source are set forth in copending application Ser. No. 287,113.

Mirrors 11 and 12, forming the laser resonant cavity, are broadband reflectors with the reflectivity of each mirror being more or less uniform over the portion of the spectrum in which the laser and laser detector are to be tuned. The main requirement on the reflectivities of mirrors 11 and 12 is that they provide a sufficiently high optical cavity Q to enable laser action to occur. The reflectivities of mirrors 11 and 12 can be optimized to yield a maximum power output.

The emission of the organic dye laser 10, which is normally broadband, is spectrally narrowed and rendered tunable by an electronically tunable tilted Fabry-Perot interferometer (FPI) 13. The FPI is used in the transmission filter mode and the laser's resonant cavity has a high Q only at wavelengths very near to the wavelength of maximum transmission of the (FPI). Thus, laser action occurs only over a very narrow spectral band centered at the wavelength of maximum transmission of the FPI 13.

One of the FPI optical reflectors is mounted on an electronically driven piezoelectric crystal indicated at 14. The drive and optical mounts for the Fabry-Perot interferometer system are available commercially. Basically, the drive consists of a cylindrical piezoelectric ceramic made of barium titanate. It is a hollow tube 5.08 centimeters long and 2.54 centimeters in diameter with a wall thickness of 0.381 centimeters. A changing voltage E applied to the tube causes it to expand and contract lengthwise, thus changing the spacing of the parallel interferometer plates. The static deflection of the piezoelectric drive is 0.6 microns per 100 volts. Thus, a 50 volt change in the d-c voltage applied to the ceramic will produce the 0.3 micron deflection necessary to scan across the 40 nanometer lasing band of a representative organic dye. In that the transmission wavelength of the Fabry-Perot interferometer is inversely proportional to the reflector spacing D, the laser's emission wavelength can be varied by varying the crystal driving voltage.

The Fabry-Perot interferometer is tilted at a very small angle $\theta$, 0.5 degrees from the vertical, so that the FPI and mirror 11 cannot form an optical resonant cavity. It is to be understood that the reflective surface of the interferometer to which the barium titante 14 is afixed is moved in a purely translational direction so that the plates remain parallel to each other.

A bandpass filter 15, whose bandpass is approximately equal to the free spectral range of the FPI 13 may be used in the resonant cavity to prevent lasing by adjacent interference orders. The bandpass filter may or may not be needed depending on the free spectral range of the FPI and the normal bandwidth over which the organic dye can lase.

The laser beam, which is wavelength (frequency) tuned in the above described manner, is transmitted into space and reflected from an object therein. A portion of the reflected energy from the object in space is collected by some type of collecting optics indicated generally at 16. The type of collecting optics used is somewhat arbitrary and does not affect the tuning of the laser or detector. In the present example, a Cassgrainian type collecting optics comprising lenses 17 and 18 is illustrated as an example only. The only requirement of the collecting and transmitting optics is that the collected light be rendered parallel before it passes through the FPI.

In order to do this in the present embodiment, a diaphragm 19 is located at the focal point of the collecting optics 16 which will pass only those collected rays which are paralled, or very near parallel, to the optical axis of the collecting optics. A lens 20 whose focal length is equal to its separation from the diaphragm 19 then renders the collected rays parallel to the laser's axis.

The interferometer 13 and the bandpass filter 15 provide a very narrow bandpass filter for a detector 21 which is synchronously tuned to the laser emission wavelength by the same piezoelectric crystal 14, as set forth before. The type of detector used to change the collected optical energy into electrical energy does not affect the tuning of the laser and detector and thus is not illustrated in any detail. The primary criterion of the detector is that it be sensitive to the wavelengths over which the laser and detector filter are tuned. In the present embodiment, the detector is shown positioned at right angles to the path of the laser beam and therefore needs a reflective mirror 22 and lens 23 to focus the laser beam on the detector cell. However, it is to be understood that the positioning of the detector with respect to the laser beam is purely arbitrary.

The FPI can be scanned in a step-wise manner or continuously. If the FPI is scanned step-wise, the operating range is given by, $$d_{step} \leq \tfrac{1}{2} (c \times t_{step})$$

where $t_{step}$ is the time between steps and $c$ is the velocity of light ($3 \times 10^5$ kilometers per second). If this condition is satisfied, the center wavelength of the FPI will not have changed until the received light has passed through the FPI. For the state-of-the-art prf of 500 pps, the maximum target distance is $d = \tfrac{1}{2} (c \times 0.002 \text{ sec}) = 300$ kilometers. It follows that if the FPI is scanned in a step-wise manner, the operating range is presently laser power limited.

If the FPI is scanned continuously, the wavelength of the emitted laser light will not coincide exactly with the center wavelength of the FPI at the time of arrival of the reflected light. For the continuously scanned case, and for the transmittance of the FPI to be one half of its peak value for the emitted wavelength at the time of arrival, the operating range is given by $$d_{cont} \leq \tfrac{1}{2} (c \times \tfrac{1}{2}\Delta\lambda/\dot\lambda),$$

where $c$ is again the velocity of light, $\Delta\lambda$ is the FPI bandwidth (full width at half peak) and $\dot\lambda$ is the FPI scan rate.

The maximum operating range for state-of-the-art parameters is $d_{cont} = \tfrac{1}{4} (c \times 0.2 \text{ nm}/150 \text{ nm/sec}) = 100$ kilometers.

Again, it follows that for the continuously scanned case, the maximum operating range is presently laser power limited.

I claim:

1. A rapidly, continuously and synchronously tuned laser transmitter and detector comprising;
    laser transmitting means for outputing energy having a relatively broad band spectrum;
    tunable filter means positioned with respect to the output of said transmitting means so that the laser beam must pass through said filter means;
    collecting optics for receiving the transmitted laser energy reflected from an object in space;
    detector means for receiving and detecting the presence of the reflected energy;
    other tunable filter means positioned with respect to said collecting optics and said detector means such that said received energy must pass through said other filter means before impinging on said detector; and
    tuning means operatively coupled to said filter means and said other filter means for synchronously tuning them.

2. The tuned laser of claim 1 wherein; said tunable filter means and said other tunable filter means comprises a Fabry-Perot interferometer.

3. A tuned laser as set forth in claim 2 wherein; the laser's resonant cavity has a high Q only at wavelengths very near the wave length of maximum transmission of the interferometer.

4. A tuned laser as set forth in claim 2 and further including; driving means physically connected to one the interferometer optical reflectors; so that the separation of the optical reflectors may be varied.

5. A tuned laser as set forth in claim 2 and further including;
    a piezoelectric crystal physically mounted to one of the interferometer optical reflectors; and
    driving means coupled to said piezoelectric crystal so that the separation of the interferometer optical reflectors can be varied by varying the voltage driving the piezoelectric crystal.

6. A tuned laser as set forth in claim 1 wherein; said tunable filter means and said other filter means comprises a single Fabry-Perot interferometer.

* * * * *